US012754955B1

(12) United States Patent
Zhao et al.

(10) Patent No.: US 12,754,955 B1
(45) Date of Patent: Oct. 6, 2026

(54) INDEXING SEMI-STRUCTURED DATA

(71) Applicant: Microsoft Technology Licensing, LLC, Redmond, WA (US)

(72) Inventors: Shanyu Zhao, Redmond, WA (US); Lijun Ji, Seattle, WA (US); Adrian Dragusanu, Sammamish, WA (US); Prabhas Kumar Samanta, Bellevue, WA (US); Wey Guy, Redmond, WA (US); Weiyun Huang, Bellevue, WA (US); Konstantin Chigintcev, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 19/212,808

(22) Filed: May 20, 2025

(51) Int. Cl.
*G06F 16/81* (2019.01)

(52) U.S. Cl.
CPC .................................... *G06F 16/81* (2019.01)

(58) Field of Classification Search
None
See application file for complete search history.

(56) References Cited

U.S. PATENT DOCUMENTS

| | | | | |
|---|---|---|---|---|
| 8,645,388 | B1 * | 2/2014 | Bueche | G06F 16/27 707/742 |
| 8,903,828 | B1 * | 12/2014 | Bueche | G06F 16/81 707/742 |
| 8,903,829 | B1 * | 12/2014 | Bueche | G06F 16/81 707/742 |
| 2007/0271218 | A1 * | 11/2007 | Lim | G06F 16/217 |
| 2014/0279856 | A1 * | 9/2014 | Srinivasan | G06F 16/23 707/609 |

OTHER PUBLICATIONS

International Search Report and Written Opinion received for PCT Application No. PCT/US2026/018258, mailed on May 15, 2026, 12 pages.

* cited by examiner

*Primary Examiner* — Christopher J Raab

(57) ABSTRACT

Methods, apparatuses, and products for indexing semi-structured data, including: generating, for a base table comprising a semi-structured data field, an inverted index for the semi-structured data field, wherein the inverted index comprises a term and a posting, and wherein generating the inverted index comprises: storing, for each combination of a plurality of unique path and value combinations of the semi-structured data field, an entry in the inverted index comprising: a path for a corresponding combination in a first field of the term, a value for the corresponding combination in a second field of the term, and an indication of each record in the base table including the corresponding combination in the posting; and storing, for one or more paths of the plurality of unique path and value combinations comprising an array index, the array index in a third field the term.

20 Claims, 11 Drawing Sheets

100

102

| Primary Key 104 | Semi-Structured Data Field 106 | 108a | | 108n |
|---|---|---|---|---|
| 1 | {"name":{"first": "Alice"}, "name-desc": "user1-very-long", "tags":[{"team": "finance"}]} | | ... | |
| 2 | {"name":{"first": "Bob"}, "tags": [{"verylongproperty": [59,61]}, {"team": "engineering"}] | | | |

FIG. 1

200

206

| Term 202 | | | Posting 204 | Other Fields 214 | | |
|---|---|---|---|---|---|---|
| Path 208 | Array Index 212 | Value 210 | 104 | 216 | 218 | 220 |
| name.first | NULL | Alice | 1 | 0x0 | NULL | NULL |
| name.first | NULL | Bob | 2 | 0x0 | NULL | NULL |
| name-desc | NULL | user1-very... | 1 | 0x0 | NULL | user1-very-long |
| tags#.team | 0x00000000 | finance | 1 | 0x0 | NULL | NULL |
| tags#.team | 0x00000001 | engineering | 2 | 0x0 | NULL | NULL |
| tags#.verylong... | 0x00000000 00000000 | 59 | 2 | 0x0 | tags#.verylongproperty # | NULL |
| tags#.verylong... | 0x00000000 00000001 | 61 | 2 | 0x0 | tags#.verylongproperty # | NULL |

FIG. 2

INDEXING SEMI-STRUCTURED DATA

BACKGROUND

Some tables include fields for semi-structured data, allowing each record of the table to store an amount of semi-structured data in this field. This semi-structured data does not have a fixed schema and typically uses hierarchical organization. For example, these records may include a field for storing JavaScript Object Notation (JSON) data or other types of semi-structured data.

The table itself can be searched and queried using an index to accelerate these operations. However, conventional table indexing cannot be used to query or search semi-structured data stored within the table. If the semi-structured data is homogeneous or uses a relatively stable schema, it may be possible to anticipate the paths likely used to query the semi-structured data. These paths and the data stored in those paths can be converted into computed columns that can then be indexed using traditional indexing techniques with the rest of the table. However, computed columns may not be usable where the semi-structured data is not homogeneous or the likely query paths are not known. To address this, existing implementations use inverted indexes specific to the semi-structured data.

Existing implementations can use dedicated inverted indexes for searching or querying semi-structured data. However, these implementations have significant drawbacks. For example, some inverted indexes map hashes of paths and values to the records including those paths and values. These hash-dependent implementations can only be used for finding exact matches in the index and cannot be used for searching across arrays. Other implementations enable searching arrays in semi-structured data by creating additional index entries that include wildcard characters. This increases the overall storage space required for the index, and may require exponentially increasing numbers of index entries as the number of array levels increases.

SUMMARY

According to embodiments of the present disclosure, various methods, apparatus, and products for indexing semi-structured data are described herein. In aspects of the present disclosure, indexing semi-structured data can include: generating, for a base table comprising a semi-structured data field, an inverted index for the semi-structured data field, wherein the inverted index comprises a term and a posting, and wherein generating the inverted index comprises: storing, for each combination of a plurality of unique path and value combinations of the semi-structured data field, an entry in the inverted index comprising: a path for a corresponding combination in a first field of the term, a value for the corresponding combination in a second field of the term, and an indication of each record in the base table including the corresponding combination in the posting; and storing, for one or more paths of the plurality of unique path and value combinations comprising an array index, the array index in a third field the term. In one or more embodiments, an apparatus may include a memory and one or more processing devices, operatively coupled to the memory, the one or more processing devices configured to perform similar steps. In one or more embodiments, a computer program product comprising a computer readable storage medium may store computer program instructions that, when executed, perform similar steps.

BRIEF DESCRIPTION OF DRAWINGS

FIG. 1 sets forth an example table for indexing semi-structured data in accordance with one or more embodiments of the present disclosure.

FIG. 2 sets forth an example inverted index for indexing semi-structured data in accordance with one or more embodiments of the present disclosure.

DESCRIPTION OF EMBODIMENTS

Figure 3:
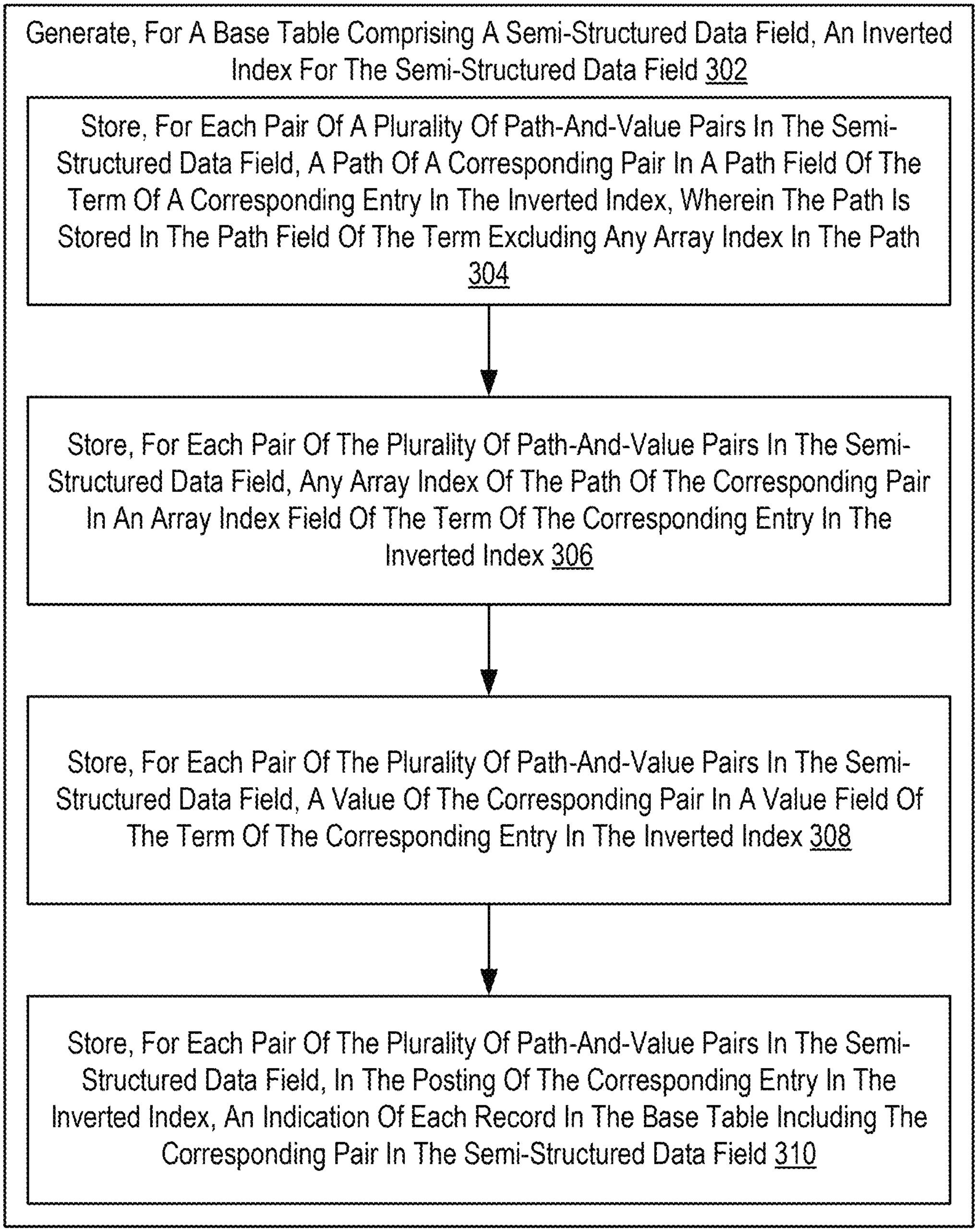
FIG. 3 sets forth a flow chart illustrating an example method of indexing semi-structured data in accordance with one or more embodiments.

Databases use indexes to speed up search and retrieval of data from tables. Such tables can include fields for semi-structured data, allowing each record of the table to store semi-structured data in this field. This semi-structured data does not have a fixed schema and typically uses hierarchical organization. For example, these records may include a field for storing JavaScript Object Notation (JSON) data or other types of semi-structured data.

Semi-structured data fields introduce complications for indexing and searching the table. Querying semi-structured data can require using a path to find the data stored therein. Traditional database indexes cannot be used to index the semi-structured data stored within a table field. Assuming that the semi-structured data is mostly homogeneous and its schema is relatively stable, the common paths likely to be used for queries can be inferred and used to create computed columns for each common path. These computed columns can then be indexed using traditional database indexing. However, this approach cannot be used where the paths to be queried are not known in advance or where it is not desirable to maintain many computed columns and indexes.

Other approaches use dedicated inverted indexes for the semi-structured data. For example, Postgres uses a Generic Inverted Index (GIN) that maps the hash of path and value pairs to a list of pointers to records in the base table having that path and value pair. As this is dependent on hashing path and value pairs, it can only be used to find exact matches for specific values and does not support searching arrays within the semi-structured data. Other approaches, such as CosmosDB, allow searching within arrays of semi-structured data. This requires creating, for each value stored in a path including an array, an inverted index entry including the specific path and its array index and another inverted index entry including a wildcard character for the array index. This duplication strategy requires additional inverted index entries with wildcards for each level of the array, causing the number of additional inverted index entries to grow exponentially as the number of array levels grow.

To address these concerns, among other benefits, the approaches set forth herein provide an approach for indexing semi-structured data fields. An inverted index maps unique sets of semi-structured data paths and values, stored as separate fields, to the corresponding records of a base table. These records are identified using their primary key(s) in the base table. If the value is stored in an array, the path includes the path to the array and a separate field is used to store the index where the value occurs. As the path and value are stored in the index separately and not hashed, these approaches do not suffer the performance degradation and functional limitations found in hash-based implementations. In particular, the use of truncated paths enables wildcard matches on property names using a LIKE operator on a path column, as will be described in further detail below. Moreover, the use of truncated values enables scanning or searching ranges of array indexes and therefore support efficient range predicates on values. Storing array indexes as separate fields allows for efficient searching within arrays. As the inverted index identifies records using their primary keys, queries for searching the semi-structured data field can be rewritten to query the inverted index for these primary keys and JOIN the results with the base table. Moreover, each term in the inverted index maps to a single record in the base table, rather than to a posting list. This single-entry design improves update performance and reduces complexity during data modifications. This indexing approach also improves resource usage by reducing memory overhead associated with storing and updating posting lists. Because the index structure uses primary keys directly and avoids list encoding and decoding, memory consumption remains stable even as the number of indexed documents grows. Query planning is also improved, as the structure of the index allows straightforward application of existing optimization frameworks to select efficient execution paths.

Accurate and efficient indexing is essential when supporting semi-structured data in tables. If the use and maintenance of a semi-structured data index is computationally expensive or has high latency, the underlying system may be unusable for workloads with high transaction volumes. The approaches set forth herein provide a semi-structured data index that is both efficient to search and update, providing significant performance benefits and usable in high volume or latency-dependent workloads. These improvements make the index practical for transactional environments and scalable to a wide variety of applications requiring fast JSON querying. Offering improved indexing capabilities for semi-structured data allows database providers to deliver faster and more responsive query performance, enhancing the end-user experience. These capabilities can drive greater adoption of database services in performance-sensitive applications, supporting customer retention and creating opportunities for increased revenue.

To begin, FIG. 1 sets forth a diagram of an example table 100 for indexing semi-structured data in accordance with one or more embodiments. The table 100 may include, for example, a table 100 of a database, data warehouse, or other data source as can be appreciated. Although the following discussion is presented in the context of a table 100, readers will appreciate that the approaches set forth herein may be applied to any type of data structure, including a field storing semi-structured data.

The table 100 includes multiple fields shown as columns of the table 100 and multiple records 102 shown as rows of the table 100. Of these fields, the table 100 includes a primary key 104. As would be understood by one skilled in the art, a primary key 104 is a field or set of fields (e.g., a column or set of columns) that uniquely identifies each record 102 in the table. The example table 100 includes an identifier as a single primary key 104 field. In one or more embodiments, the example table 100 may include multiple primary key 104 fields with each unique combination of values for these primary key 104 fields serving to uniquely identify each record 102.

The table 100 also includes a semi-structured data field 106. In one or more embodiments, the table 100 may also include one or more other fields 108*a-n* for storing other data in the table 100 in addition to semi-structured data. The semi-structured data field 106 is a field of records 102 that stores semi-structured data. For example, the semi-structured data field 106 may include a field of column for a string or other encoding of text. As referred to herein, semi-structured data is data that has an organization or structure without a rigid schema as in structured data. For example, in one or more embodiments, semi-structured data may use tags, markers, or other metadata to define the structure of data elements, making the semi-structured data easier to search and analyze when compared to semi-structured data. Continuing with this example, in one or more embodiments, the semi-structured data may use a hierarchical approach to data organization. Other approaches may also be used to organize the semi-structured data in the semi-structured data field 106.

The semi-structured data in the semi-structured data field 106 may be encoded using a variety of approaches. For example, in one or more embodiments, the semi-structured data field 106 may store semi-structured data encoded using a markup language, data interchange format, or object notation. Continuing with this example, in one or more embodiments, the semi-structured data field 106 may store JavaScript Object Notation (JSON) data or other semi-structured data as can be appreciated. As the approaches set forth herein may be applied to any type of encoding or formatting for semi-structured data, in one or more embodiments, the particular formatting or language used for the semi-structured data field 106 may vary according to design or engineering considerations.

In this example, the semi-structured data field 106 stores a semi-structured data object including multiple fields and values. Each field may be mapped to one or more values or may include one or more nested or child fields. A field, and its parent fields, mapped to a particular value form the path to that value. Here, the field "name" has a nested or child field of "first," forming a path "name.first" in the semi-structured data. In the records 102 shown, the value for this path is "Alice" or "Bob," respectively. The semi-structured data of the first record 102 (e.g., having a primary key 104 of one) also includes a field "name-desc" with the value "user-very-long" and the field "tags." Rather than being mapped to a single value, the field "tags" is mapped to an array. This array includes a single entry, the field "team" mapped to the value "finance." The semi-structured data of the second record 102 does not include the "name-desc" field but includes the field "tags" mapped to another array. This array includes two entries: the field "verylongproperty" mapped to a nested array of two values, and the field "team" mapped to the value "engineering."

As shown, the semi-structured data field 106 stores semi-structured data that can be queried or referenced using a path for the semi-structured data. For example, to reference or query the value for the first name in the first record 102, the path "name.first" can be used, returning the value "Alice." As another example, to reference the value for the team tag in the second record 102, the path "tags #.team" can be used, returning the value "engineering." In one or more embodiments, in addition to searching the table 100 using traditional database querying or searching techniques, the structure and hierarchy of the semi-structured data may also be searchable or queryable. For example, in one or more embodiments, the semi-structured data field 106 should be queryable to return the value for a specific path in the semi-structured data. As another example, in one or more embodiments, the semi-structured data field 106 should be searchable to find specific values or to determine if the semi-structured data field contains a value. In one or more embodiments, this may include searching within multiple indexes of arrays in the semi-structured data field 106.

To address these concerns, indexing semi-structured data as described herein uses an inverted index 200 that indexes the semi-structured data field 106 of a table 100 so as to expedite the search and querying of semi-structured data fields 106. Accordingly, FIG. 2 shows an example inverted index 200 in accordance with one or more embodiments of the present disclosure. Particularly, the example inverted index 200 serves to index the semi-structured data field 106 of the table 100 of FIG. 1, enabling search or querying of information stored in the semi-structured data field 106. In one or more embodiments, the inverted index 200 may be implemented as an internal table or other data structure of a database system. In one or more embodiments, this inverted index 200 may be used in combination with other indexes of the table 100 for searching or querying other fields 108*a-n*. Accordingly, the entries 206 found in the example inverted index 200 reflect the records 102 shown in the table 100 of FIG. 1.

As would be understood by one skilled in the art, an inverted index 200 maps content that can be found in a table 100, known as a term 202, to the records 102 that include that content, known as a posting 204. Here, the inverted index 200 maps, as the term 202, data found in the semi-structured data field 106 of the table 100 to, as the posting 204, records 102 of the table 100 that include that data in their semi-structured data field 106. In one or more embodiments, the posting 204 includes the primary key(s) 104 of the table. Thus, in one or more embodiments, a given entry 206 of the inverted index 200 includes, for the data described by the term 202, a listing or enumeration of the primary keys 104 of the table 100 that include, in their semi-structured data field 106, the data described by the term 202.

The term 202 of the example inverted index 200 includes three fields. Readers will appreciate that, in one or more embodiments, additional fields may also be included in the term 202 of the inverted index 200. In one or more embodiments, the term 202 includes a path 208 and a value 210. As would be understood by one skilled in the art, a path 208 in semi-structured data includes an identifier for a particular value 210 as found in the semi-structured data. For example, in one or more embodiments, the path 208 includes a string representation of one or more levels of a hierarchical organization of semi-structured data. The value 210 is the particular value found at the corresponding path 208.

Returning to the example table 100 of FIG. 1, the semi-structured data field 106 of both records 102 includes the parent field "name" with a child field "first." Here, this hierarchy of fields is shown as the path 208 "name.first." The inverted index 200 includes two entries for the two different values 210 for "name.first" found in the table 100, "Alice" and "Bob." The posting 204 for the entry 206 including the value 210 "Alice" includes the primary key 104 for the first record 102 while the posting 204 for the entry 206 including the value 210 "Bob" includes the primary key 104 for the second record 102. Here, each value 210 is only found in a single record 102. In one or more embodiments, should a value 210 be found in multiple records 102 the posting 204 for that entry 206 may include the primary keys 104 of these multiple records.

The inverted index 200 serves to map each unique combination of paths 208 and values 210 to the records 102 of the table 100 including those values 210 at the specific paths 208. In the examples above, the values 210 identified by the corresponding paths 208 are mapped directly to the leaf field (e.g., the lowest level field) in corresponding path 208. In other words, these paths 208 terminate at a field directly mapped to a single value 210. In one or more embodiments, a path 208 to a value 210 may include an array in which the value 210 is stored. In such embodiments, a value 210 must be identified in the inverted index 200 using both the index in the array in which it is found and the path 208 that includes the array.

Accordingly, in one or more embodiments, the term 202 of the inverted index 200 also includes an array index 212. The array index 212 identifies where in an array identified by the path 208 a corresponding value 210 is found. Here, where the value 210 is not stored in an array, the value of the array index 212 is stored as "NULL." Otherwise, the array index 212 stores the numerical index of where the corresponding value 210 is stored. In one or more embodiments, where a path 208 to a value 210 includes an array index 212, the path 208 as stored may replace references to array indexes 212 with a placeholder character such as "#" as shown, thereby excluding the array index 212 from the path 208 as stored in the inverted index 200. For example, a JSON path 208 "$.a.b [1][2][3].c" will be stored in the path 208 of inverted index 200 as "a.b ###.c." Thus, in one or more embodiments, for the purposes of mapping each unique combination of paths 208 and values 210 to the records 102 of the table 100 including those values 210, the array index 212 may be considered a subcomponent of the path 208 that has been extracted into its own field of the inverted index 200. The inverted index 200 can therefore map each unique combination of path 208 (including array index 212 where applicable) and value 210 to the records 102 of the table 100 including those values 210 at that path 208. Readers will appreciate that recitations referencing particular paths 208, including querying a particular path 208 or having values 210 stored at particular paths 208, may implicitly include array indexes 212 even where not explicitly recited.

The array index 212 may be encoded using a variety of approaches. In one or more embodiments, the array index 212 is encoded as a bit string. The example inverted index 200 shows this bit string using hexadecimal for clarity and conciseness. Although the array index 212 is described as a bit string, readers will appreciate that, in one or more embodiments, the array index 212 is not stored using a string encoding but rather as a numerical value encoded using multiple bits. In one or more embodiments, the array index 212 is encoded using a fixed number of bits for each level of the array in which the value 210 is stored. In other words, in one or more embodiments, the array index 212 is encoded as a bit string that includes one or more fixed-length sub-strings each corresponding to a different array depth. As an example, assume that each level of an array is encoded in the array index 212 using four bytes. In this example, the array index 212 for a one-dimensional array is encoded using four bytes, a two-dimensional array is encoded using eight bytes (e.g., four bytes for the first level and four bytes for the second level), and so forth. Turning back to the example above, the JSON path 208 "$.a.b [1][2][3].c" will be stored in inverted index 200 with a path 208 of "a.b ###.c" and an array index 212 of "0x000000010000000200000003."

Returning back to the example table 100 of FIG. 1, the semi-structured data field 106 of both records includes an array of tags. For the first record 102, the first entry of the array mapped to the "tags" field includes a field "team" mapped to the value 210 "finance." Accordingly, the inverted index 200 includes an entry 206 with the path 208 "tags #.team" (including a placeholder character "#" for the array index 212), an array index 212 of zero, and the corresponding value 210 of "finance." For the second record 102, the field "team" is found at the second entry of the tags array. Accordingly, the inverted index 200 includes an entry with the path 208 "tags #.team," an array index 212 of one, and the corresponding value 210 of "engineering." The second record 102 also includes, as the first entry of the tags array, the field "verylongproperty" mapped to a nested array of two numerical values. The inverted index 200 includes entries 206 for each unique value 210 of the "verylongproperty" nested array. As this nested array is found within the tags array, each unique value of the "verylongproperty" 210 has an array index 212 of eight bytes representing the two levels of array depth in which these values are found. The first four bytes of these array indexes 212 are set to zero as the nested array is found at the first index of the tags array. The second four bytes of the array indexes 212 are zero or one, respectively, reflecting the particular index within the nested array that each value 210 is found.

In one or more embodiments, the inverted index 200 includes one or more other fields 214, fields not considered part of the term 202 or posting 204 of the inverted index 200. In one or more embodiments, these other fields 214 may include a status 216 field storing status codes or other information, depending on the particular design or engineering considerations under which the inverted index 200 is used. In one or more embodiments, as will be described in further detail below, the path 208 or the value 210 of an entry 206 may be truncated to a reduced length when stored in the term 202 of the entry 206. Accordingly, in one or more embodiments, these other fields 214 may include an untruncated path 218 or untruncated value 220 that stores the path 208 or value 210 in untruncated form.

In one or more embodiments, the inverted index 200 may be subject to restrictions as to the ordering of its fields and/or the amount of data that can be stored in those fields. For example, in one or more embodiments, the inverted index 200 includes a clustered index for the term 202. As would be understood by one skilled in the art, a clustered index is a type of index where entries 206 are reordered based on the fields subjected to clustered indexing. Accordingly, in one or more embodiments, the entries 206 of the inverted index 200 may be stored and/or reordered based on the content of their term 202. As shown, the entries 206 of the example inverted index 200 are grouped so that entries 206 with the same path 208 are grouped together.

In one or more embodiments, the keys of a clustered index (e.g., the fields used by the clustered index) are limited to a maximum length. For example, in one or more embodiments, the keys of a clustered index may not exceed nine-hundred bytes. Accordingly, in one or more embodiments, the term 202 of the inverted index 200 may be limited so that the combined amount of data used to encode the term 202 of any entry 206 may not exceed this limit. In one or more embodiments, each field of the term 202 may be subject to a maximum length (e.g., a maximum number of characters or bytes) so that the combined maximum length of all fields of the term 202 does not exceed the maximum limit for clustered index keys. Accordingly, in one or more embodiments, where the path 208 or value 210 of an entry 206 exceeds its corresponding limit, the path 208 or value 210 can be truncated to a number of leading characters not exceeding the maximum limit of the respective field. The path 208 and/or value 210 can be stored in untruncated form in the untruncated path 218 field or untruncated value 220 field, respectively.

In one or more embodiments, each field of the term 202 may not have a maximum length or the combined maximum length of all fields of the term 202 may exceed the maximum limit for clustered index keys. In one or more embodiments, the path 208 and/or the value 210 may be truncated to a dynamically determined length so that the combined length of the term 202 does not exceed this maximum limit. As an example, assume a maximum term 202 length (e.g., a maximum clustered index key) of nine-hundred bytes. Further assume a maximum path 208 length of six-hundred and thirty bytes, a maximum array index 212 length of five-hundred and twelve bytes, and a maximum value 210 length of two-hundred and fifty-six bytes.

In this example, the combined maximum length of each field of the term 202 is 1398 bytes, exceeding the maximum clustered index length of nine-hundred bytes. Accordingly, in one or more embodiments, the path 208 and/or the value 210 may be truncated so that the term 202, as stored, does not exceed nine-hundred bytes for any entry 206. For example, in one or more embodiments, the path 208 is truncated so that the combined path 208 and array index 212 do not exceed six-hundred and thirty bytes. As the value 210 is limited to two-hundred and fifty-six bytes, this ensures that the combined term 202 length does not exceed eight-hundred and eighty-six bytes. Readers will appreciate that this approach for truncating the term 202 and/or the value 210 are merely illustrative and that other approaches are contemplated within the present disclosure.

In one or more embodiments, the ordering of the fields of the term 202 (e.g., the ordering of the columns of the term 202) may affect performance when using the clustered index of the inverted index 200 to search or query the semi-structured data field 106. In one or more embodiments, this order may be set according to various design or engineering considerations. In one or more embodiments, this ordering may be set or determined as a configurable parameter, allowing for the particular ordering of the fields of the term 202 to change depending on the particular use case or implementation of the inverted index 200. For example, in one or more embodiments and as shown in the inverted index 200 of FIG. 2, the term 202 includes, in order, the path 208, the array index 212, and the value 210. In one or more embodiments, this particular ordering provides faster querying of specific array indexes 212 in the semi-structured data field 106 but is slower when searching arrays for specific values. In one or more embodiments, the term 202 includes, in order, the path 208, the value 210, and the array index 212. In one or more embodiments, this particular ordering provides for faster array search but slower querying of specific array indexes 212.

In one or more embodiments, the inverted index 200 may include a non-clustered index on the posting 204. In a non-clustered index, the indexed fields do not affect the order of the entries 206 in the index. In one or more embodiments, the inverted index 200 implements a binary tree or other data structure to facilitate expedited and efficient search of the inverted index 200. Thus, in one or more embodiments, the inverted index 200 can be searched using the clustered index on the term 202 and/or the non-clustered index on the posting 204.

In one or more embodiments, assuming an existing base table 100 exists, the inverted index 200 is generated by identifying each unique combination of path 208 (including any array indexes 212, where applicable) and value 210 in the semi-structured data field 106 across all records 102 and creating an entry 206 for that combination. In other words, in one or more embodiments, generating the inverted index 200 includes identifying each unique term 202 found in the semi-structured data field 106 across all records 102 and creating a corresponding entry 206. This may include, for example, parsing or otherwise traversing the semi-structured data stored in the semi-structured data field 106 of each record 102.

In one or more embodiments, the inverted index 200 is updated to reflect changes in the base table 100 from which it was generated, including adding, removing, and/or modifying records 102 in the table. In one or more embodiments, in response to adding a new record 102 to the table 100, the semi-structured data field 106 for the new record 102 is analyzed (e.g., through parsing or other approaches) to identify any unique path 208 and value 210 combinations (e.g., any terms 202) not reflected in the inverted index 200. In other words, in response to adding a new record 102 to the table, any unique terms 202 not having an entry 206 in the inverted index 200 are identified. New entries 206 are added for these terms 202, including a posting 204 identifying the primary key(s) 104 of the new record 102. Should the new record 102 not include any terms 202 not found in the inverted index 200 no new entries 206 will be added. Additionally, in response to adding the new record 102, the inverted index 200 is searched to determine if the new record 102 includes any terms 202 already having an entry 206 in the inverted index 200. If so, the posting 204 for those entries 206 is updated to include the primary key(s) 104 of the new record. If no matching entries 206 are found then no entries 206 need be updated.

In one or more embodiments, in response to removing a record 102 from the table 100, the posting 204 of the inverted index 200 is searched to identify those entries 206 referencing the removed record 102 in their posting 204. The posting 204 of any identified entries 206 is updated to remove the primary keys 104 of the removed record 102. In response to modifying a record 102 in the table 100, as with removing a record 102, entries 206 referencing the modified record 102 are identified and references to the modified record 102 are removed from their postings 204. The inverted index 200 is then updated as is described above with respect to adding a new record 102, effectively treating the modified record 102 as a new record 102. For example, after removing references to the modified record 102 from the postings 204 of the inverted index 200, entries 206 with terms 202 matching the modified record 102 are updated to include, in their postings 204, primary keys 104 of the modified record 102. As another example, entries 206 are added to the inverted index 200 for terms 202 reflected in the modified record 102 but not having a matching entry 206 in the inverted index 200. In one or more embodiments, updating postings 204 to remove references to removed or modified record 102 may result in an empty or NULL posting 204 (e.g., such as where the entry 206 only references the removed or modified record 102). Accordingly, in one or more embodiments, entries 206 with empty or NULL postings 204 may be deleted from the inverted index 200.

In one or more embodiments, a query directed to the table 100 may include a clause or predicate targeting the semi-structured data field 106. For example, in one or more embodiments, a query to the table 100 may include a clause or predicate that accesses the semi-structured data field 106 to return the value 210 at a specific path 208. As another example, in one or more embodiments, a query to the table 100 may include a clause or predicate that searches for records 102 including a particular value 210 at a path 208, including across a range of indexes in an array of the semi-structured data field 106. In one or more embodiments, this query may be rewritten or modified to instead include a clause or predicate targeting the inverted index 200.

In one or more embodiments, query languages such as Structured Query Language (SQL) support functions for querying or searching semi-structured data stored within a table 100. For example, SQL supports the json_contains( ) function that determines whether a record 102 has a value 210 stored at a path 208 defined as parameters of the function. This may be used as part of a filter predicate for selecting only those records 102 that have that that value 210 at the specific path 208. As another example, the json_extract( ) function returns the value 210 mapped to a path 208 included as a parameter of the function.

In one or more embodiments, as the inverted index 200 is implemented as an internal table, it can be queried as with other tables 100. Accordingly, in one or more embodiments, these semi-structured data-specific functions can be replaced with predicates including sub-queries to the inverted index 200. As an example, assume the following example SQL query: "select * from where json_contains (search_column, search_value, '11.a[0][1].b')=1." In this example query, "t" is the name of a table 100 and "search_column" is the name of the semi-structured data field 106 of the table 100. This query selects all records 102 having the value 210 "search_value" stored in the path 208 "$.a[0][1].b." In one or more embodiments, the following sub-query can be used as a predicate instead of the json_contains function: "select posting from inverted_index where (path='a #.b' AND array_index=0x0000000000000001 AND value=search_value)." Here, "posting" is the posting 204 column of the inverted index 200, "array_index" is the array index 212 column of the inverted index 200, "value" is the value 210 column of the inverted index 200, and "inverted_index" is the name of the internal inverted index 200 table. As the posting 204 includes the primary keys 104 of the table, this sub-query will return the primary keys 104 of those records 102 having the value 210 "search_value" stored at the path 208 "a.b." Accordingly, in one or more embodiments, the existing WHERE clause can be replaced with a JOIN on the primary keys 104 returned by this sub-query. Readers will appreciate that this example is merely illustrative and that other approaches may also be used to modify queries directed to a semi-structured data field 106.

As another example, assume a similar query as described above, instead using the function json_contains (search_column, search_value, '11.a[*][1].b). Rather than referencing a specific array index 212, this function searches across the highest level of the array for the search_value. In contrast to other semi-structured indexing solutions that do not support array search, in one or more embodiments, semi-structured data-specific functions using wildcards for an array search can be replaced with a sub-query that uses the "LIKE" clause. For example, the following sub-query can be used as a predicate instead of this json_contains function: "select posting from inverted_index where (path= 'a #.b' AND array_index LIKE 0x_00000001 AND value=search_value) ." Readers will appreciate that, in one or more embodiments, where the array index 212 is stored as a binary or numerical value, this query may include a cast of the array index 212 to a character encoding for use with the LIKE function. In this example, as the json_contains function searches the highest level of the array, the array index 212 is searched using leading underscore characters as wildcards. Thus, this sub-query returns the posting 204 of any entries 206 having the value 210 at index one of the second array level.

The approaches set forth above provide significant advantages over existing implementations for indexing semi-structured data. For example, one or more implementations use inverted indexing that maps, as the term, a hash of the path and value to a posting. As these implementations are dependent on hashing, these indexes can only be used for searching for specific values at specific paths where the hashes match. This makes searching through arrays impossible. Other implementations may support array search but do so by creating, for each path including a specific array index, an additional index entry that includes a wildcard in place of the array index of the path. This requires double the number of entries for a one-dimensional array. For example, for a value stored at path "$.a[2]," index entries must be added for "$.a[2]" and "$.a[*]," For multidimensional arrays, entries must be created with wildcards at each level of the array across all combinations of specific values and wildcards. For example, for a value stored at path "$.a[2][6]," index entries must be added for "$.a[2][6]," "$.a[*][6]," "$.a[2][*]," and "$.a[*][*]." Thus, the number of index entries required increases exponentially for each added level of array depth. In contrast, the existing implementations only require a single entry 206 to search for a value 210 at any level of an array.

Moreover, hash-based approaches for semi-structured data indexing are computationally expensive and have higher latency when searching and updating the index. For example, searching the index requires the search parameters to be hashed for matching. As another example, updating the index requires for terms and postings affected by the update to be decoded from the index, modified, and then reencoded and stored. Due to this computational complexity and high latency, updates to these indexes may be batched, potentially introducing delays between updates to the base table and when those updates are reflected in the index. This makes these existing implementations unsuitable for latency-dependent and/or high-volume workloads. In contrast, the approaches set forth herein achieve significantly faster performance compared to existing solutions, making these implementations suitable in high-volume or latency-dependent deployments.

For further explanation, FIG. 3 sets forth a flowchart of an example method of indexing semi-structured data in accordance with one or more embodiments of the present disclosure. The method of FIG. 3 may be performed, for example, by any of the computing devices, systems, or execution environments described herein. The method of FIG. 3 includes generating, for a base table 100 comprising a semi-structured data field 106, an inverted index 200 for the semi-structured data field 106. As would be understood by one skilled in the art, an inverted index 200 is an index that maps content (e.g., a term 202) to the data that includes that content (e.g., a posting 204). Here, the inverted index 200 serves to map the term 202 to, as the posting 204, those records 102 of the base table 100 that includes the term 202 in their semi-structured data field 106. Thus, the inverted index 200 may be used to search the semi-structured data field 106 and/or query values 210 from the semi-structured data field 106. In one or more embodiments, the inverted index 200 may be used in combination with other indexes for the base table 100 to facilitate searching and querying the base table 100.

In one or more embodiments, generating 302 the inverted index 200 includes identifying a plurality of path-and-value pairs in the semi-structured data field 106. This may include, for example, identifying each different or unique path-and-value pair in the semi-structured data field 106. As referred to herein, a path-and-value pair is a path 208 (e.g., of one or more hierarchical fields, including one or more array indexes 212 where applicable) and the value 210 to which that path 208 is mapped. In some embodiments, generating 302 the inverted index 200 includes storing an entry 206 in the inverted index 200 for each of the identified path-and-value pairs.

In some embodiments generating 302 the inverted index includes storing 304, for each pair of a plurality of path-and-value pairs in the semi-structured data field 106, a path 208 of a corresponding pair in a path 208 field of the term 202 of a corresponding entry 206 in the inverted index 200, wherein the path 208 is stored in the path 208 field of the term 202 excluding any array index 212 in the path 208. In other words, in some embodiments, the path 208 of each of the path-and-value pairs is stored 304 in a corresponding entry 206 in the inverted index 200. Where the path 208 of the pair does not include an array index 212, the path 208 is stored in the path 208 as encoded in the semi-structured data field 106 or with minimal modifications or transformations, such as adding or removing special characters or other formatting as can be appreciated. For example, a JSON path 208 of "$.a.b" may be stored as ".a.b," removing the leading "$" character. Where the path 208 of the pair includes an array index 212, the path 208 is stored 304 in the path 208 field by excluding the array index(es) 212. For example, this may include replacing the array index(es) 212 in the path 208 with a replacement character or combination of characters. Continuing with this example, a JSON path 208 of "$.a[1].b" may be stored as "a #.b," replacing the array index 212 "[1]" with the character "#."

In some embodiments, generating 302 the inverted index 200 also includes storing 306, for each pair of the plurality of path-and-value pairs in the semi-structured data field 106, any array index 212 of the path 208 of the corresponding pair in an array index 212 field of the term 202 of the corresponding entry 206 in the inverted index 200. In some embodiments, where a path 208 of a pair does not include an array index 212, a default value may be stored or maintained in the array index 212 field, such as a "NULL" value. In some embodiments, where a path 208 of a pair includes an array index 212, the array index 212 is stored in the array index 212 field. Thus, for pairs including an array index 212 in the path 208, the array index 212 is stored in an array index 212 field and the path 208 excluding the array index 212 is stored in the path 208 field of the inverted index 200.

The array index 212 may be encoded using a variety of approaches. In some embodiments, the array index 212 is encoded as a binary value. The example inverted index 200 shows this bit string using hexadecimal for clarity and conciseness. In some embodiments, the array index 212 is encoded using a fixed number of bits for each level of the array in which the value 210 is stored. As an example, assume that each level of an array is encoded in the array index 212 using four bytes. In this example, the array index 212 for a one-dimensional array is encoded using four bytes, a two-dimensional array is encoded using eight bytes (e.g., four bytes for the first level and four bytes for the second level), and so forth.

In some embodiments, generating 302 the inverted index 200 also includes storing 308, for each pair of the plurality of path-and-value pairs in the semi-structured data field 106, a value 210 of the corresponding pair in a value 210 field of the term 202 of the corresponding entry 206 in the inverted index 200. Thus, the term 202 of the inverted index 200 includes, for each pair of the path-and-value pairs, a path 208, a value 210, and an array index 212, where applicable.

In some embodiments, generating 302 the inverted index 200 also includes storing 310, for each pair of the plurality of path-and-value pairs in the semi-structured data field 106, in the posting 204 of the corresponding entry 206 in the inverted index 200, an indication of each record 102 in the base table 100 including the corresponding pair in the semi-structured data field 106. For example, in some embodiments, the posting 204 includes, for each pair, the primary key(s) 104 of those records 102 including the term 202 in their respective semi-structured data fields 106.

Figure 4:
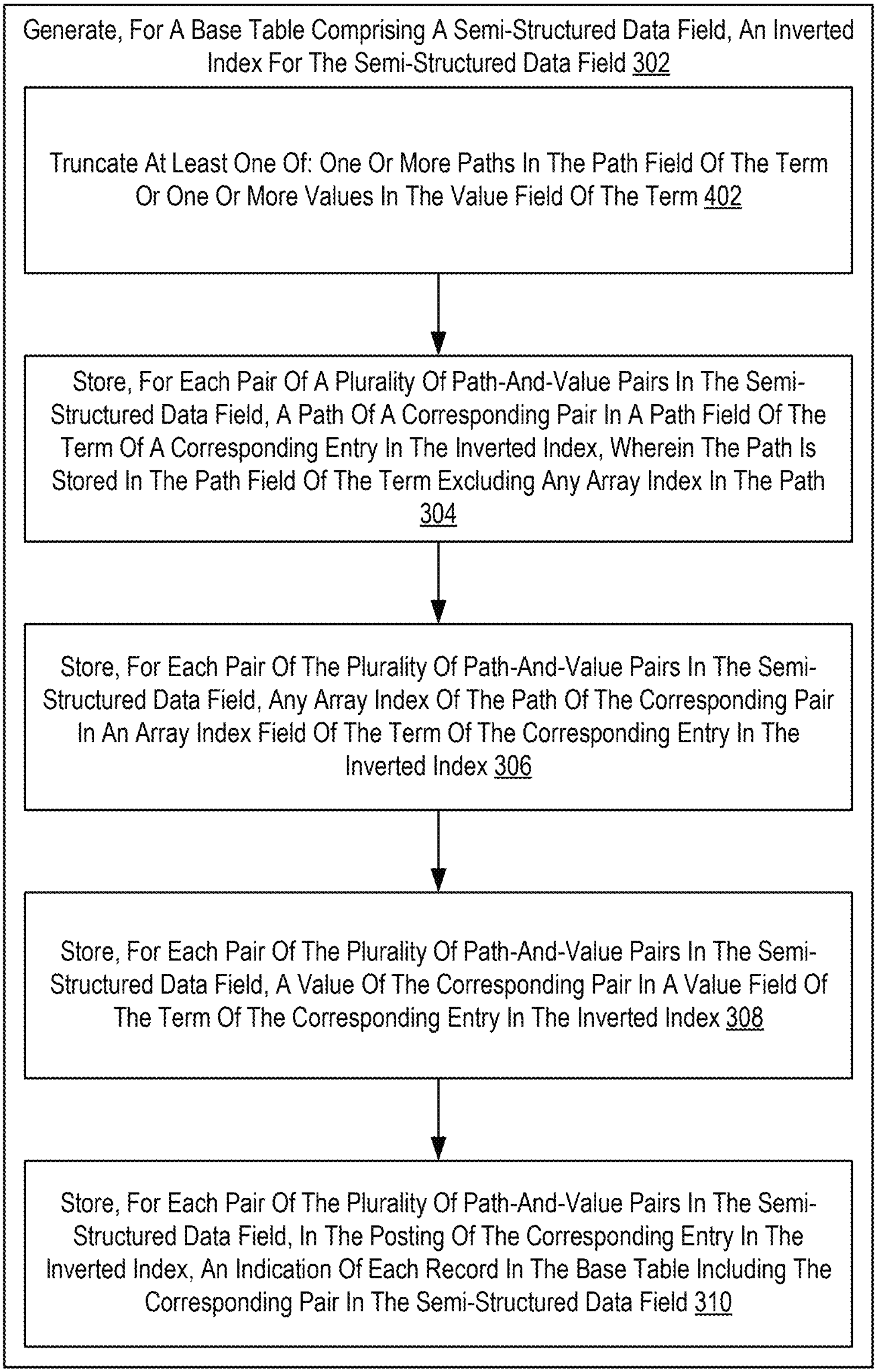
FIG. 4 sets forth a flow chart illustrating an additional example method of indexing semi-structured data in accordance with one or more embodiments.

For further explanation, FIG. 4 sets forth a flowchart of another example method of indexing semi-structured data in accordance with some embodiments of the present disclosure. The method of FIG. 4 is similar to FIG. 3, differing in generating 302 the inverted index 200 also includes truncating 402 at least one of: one or more paths 208 in the path 208 field of the term 202 or one or more values 210 in the value 210 field of the term 202. In some embodiments, the term 202 and/or one or more fields of the term 202 of the inverted index 200 may be subject to some maximum length. For example, in some embodiments, one or more fields of the term 202 may each have their own maximum length (e.g., a maximum number of bytes or characters). As another example, in some embodiments, the inverted index 200 includes a clustered index on the term 202. In this example, the clustered index may have some maximum length for all data stored in the term 202 of an entry 206 (e.g., in total across all fields of the term 202). Accordingly, in some embodiments, the path 208 and/or the value 210 as stored in the term 202 of the entry may be truncated 402 so that these maximum lengths are not exceeded. In some embodiments, truncating a path 208 or value 210 includes storing some number of leading characters of the path 208 or value 210.

Figure 5:
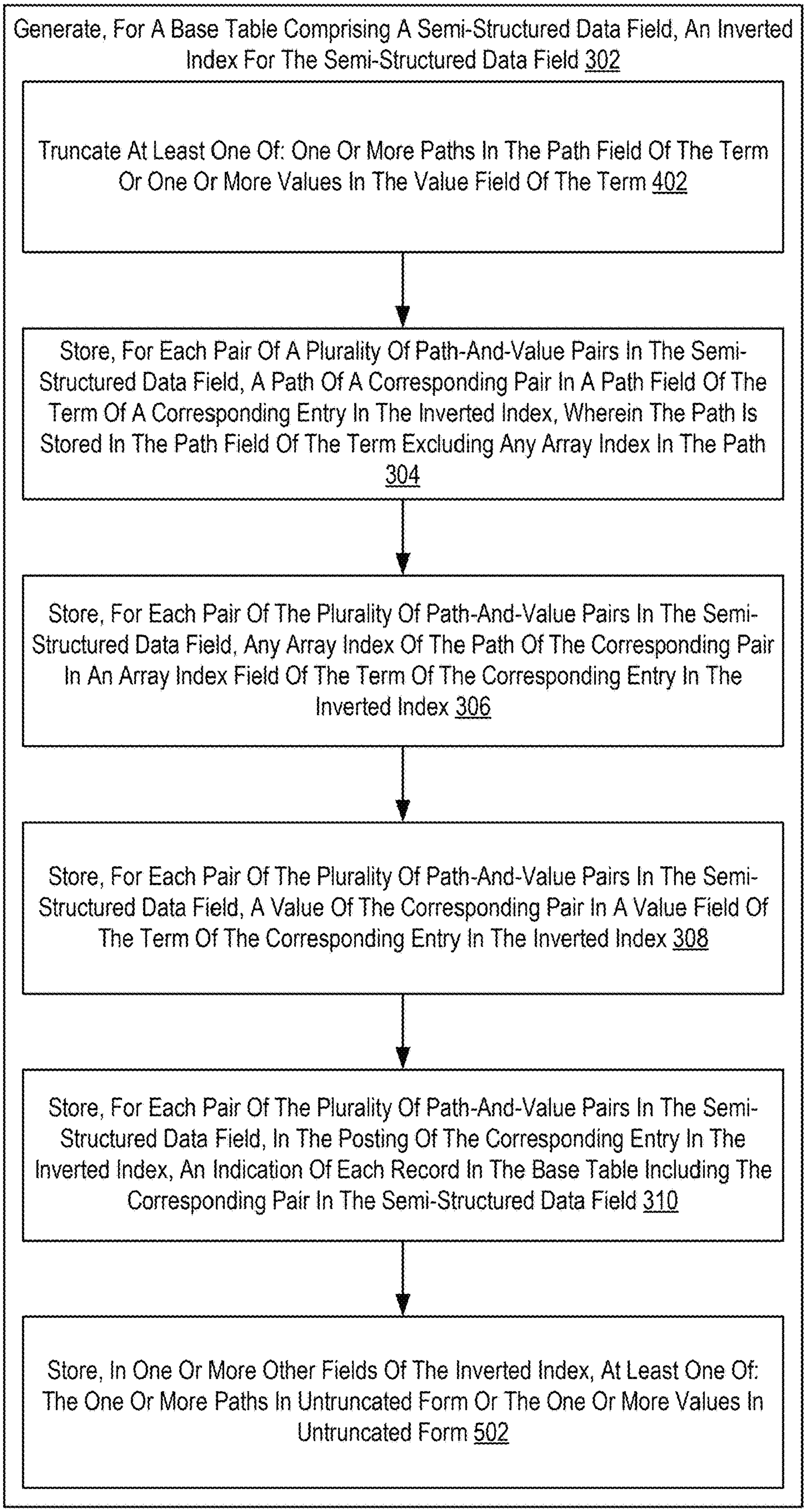
FIG. 5 sets forth a flow chart illustrating an additional example method of indexing semi-structured data in accordance with one or more embodiments.

For further explanation, FIG. 5 sets forth a flowchart of another example method of indexing semi-structured data in accordance with some embodiments of the present disclosure. The method of FIG. 5 is similar to FIG. 4, differing in generating 302 the inverted index 200 also comprises storing 504, in one or more other fields of the inverted index 200, at least one of: the one or more paths 208 in untruncated form or the one or more values 210 in untruncated form. In some embodiments, where a path 208 and/or value 210 is truncated in the term 202 of the inverted index 200 entry 206, this path 208 and/or value 210 may be stored in other fields 214 of the same entry 206. For example, in some embodiments, the inverted index 200 includes one or more other fields 214 in addition to the term 202 and the posting 204. In some embodiments, these one or more other fields 214 may include an untruncated path 218 or untruncated value 220. Accordingly, in some embodiments, the path 208 and/or value 210 may be stored in truncated form in the term 202 of the inverted index 200 and in untruncated form in the untruncated path 218 and/or untruncated value 220 fields of the inverted index 200.

Figure 6:
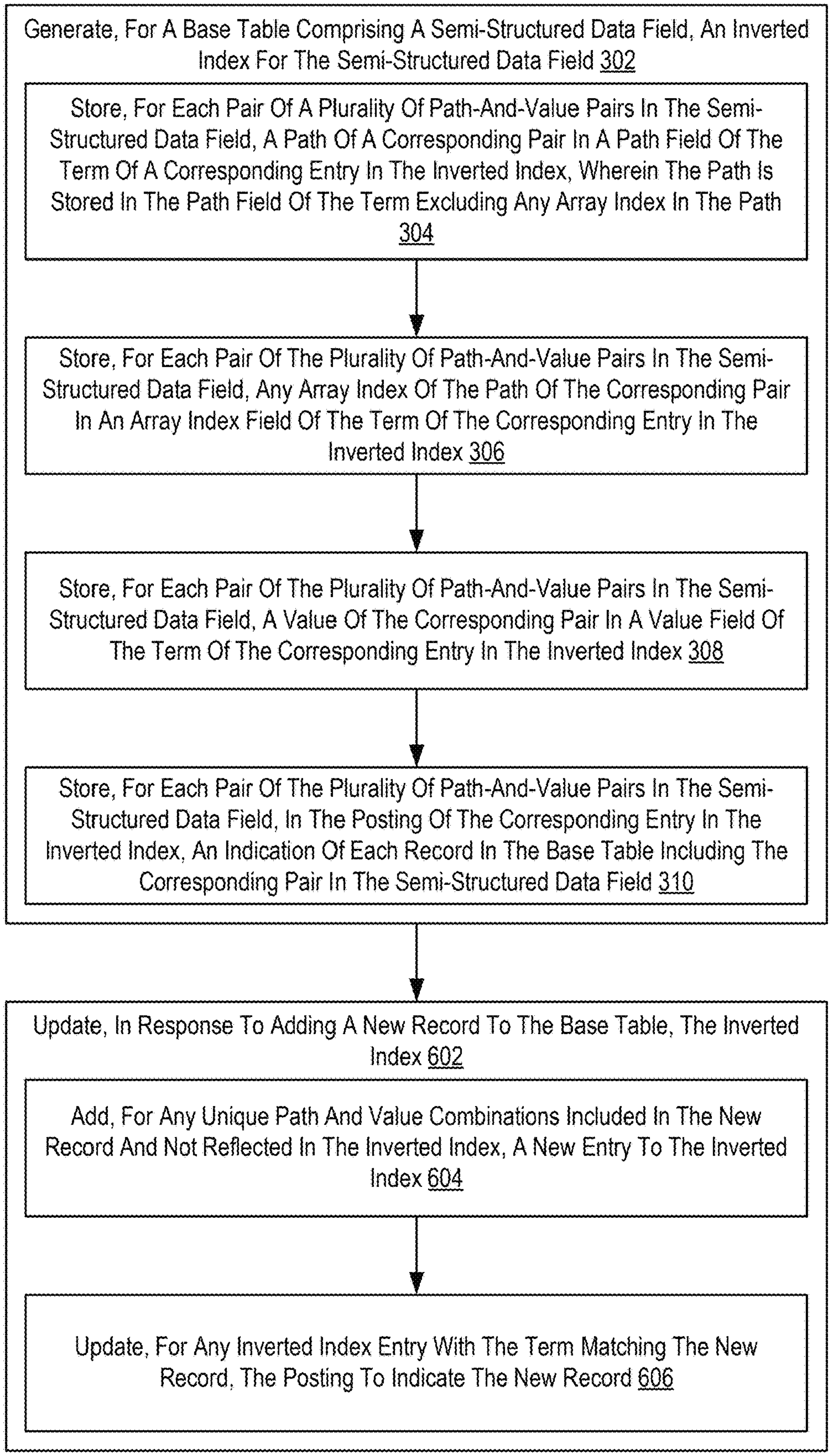
FIG. 6 sets forth a flow chart illustrating an additional example method of indexing semi-structured data in accordance with one or more embodiments.

For further explanation, FIG. 6 sets forth a flowchart of another example method of indexing semi-structured data in accordance with some embodiments of the present disclosure. The method of FIG. 6 is similar to FIG. 3, differing in that the method of FIG. 6 also includes updating 602, in response to adding a new record 102 to the base table 100, the inverted index 200. As is set forth above, the approaches described herein provide significant performance boots and latency reduction compared to existing implementations for indexing semi-structured data. Accordingly, in contrast to these existing implementations, the approaches described herein may be used to update the inverted index 200 in real time or substantially real time as records 102 in the base table 100 are added, removed, and/or modified.

In the example method of FIG. 6, the inverted index 200 is updated 602 in response to adding a new record 102 to the inverted index. Where a new record 102 is added to the base table 100, the inverted index 200 must be updated to reflect any terms 202 found in the new record 102. Accordingly, in some embodiments, updating 602 the inverted index 200 also includes adding 604, for any path-and-value pairs included in the new record 102 and not reflected in the inverted index 200, a new entry 206 to the inverted index 200. In other words, an entry 206 is added 604 to the inverted index 200 for any term 202 included in the new record 102 that does not have a matching entry 206 in the inverted index 200.

In some embodiments, the new record 102 may include pairs of paths 208 and values 210 (e.g., terms 202) having a matching entry 206 in the inverted index 200. Accordingly, in some embodiments, updating 602 the inverted index 200 also includes updating 606, for any inverted index 200 with the term 202 matching the new record 102, the posting 204 to indicate the new record 102. For example, in some embodiments, the posting 204 of entries 206 with terms 202 matching the new record 102 may be updated to include the primary key(s) 104 of the new record 102.

For example, in some embodiments, for each path-and-value pair found in the semi-structured data field 106 of the new record 102, the inverted index 200 is searched (e.g., using a clustered index) to determine if any entry 206 has a matching term 202 for a given pair. If a matching entry 206 is found, the posting 204 of that entry 206 is updated to include the primary key(s) of the new record 102. If no matching entry 206 is found, a new entry 206 is created for that pair that includes, in its posting 204, the primary key(s) of the new record 102.

Figure 7:
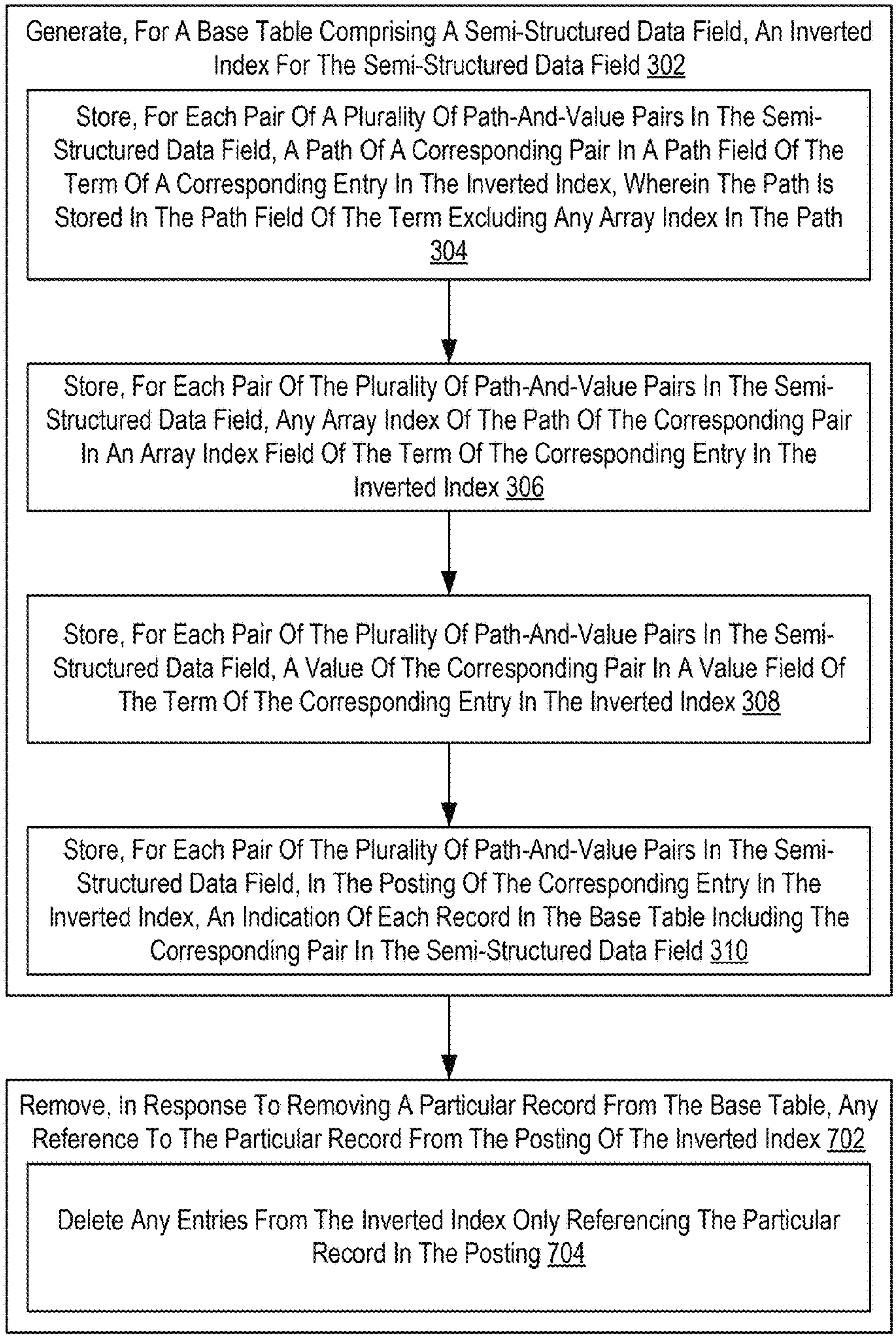
FIG. 7 sets forth a flow chart illustrating an additional example method of indexing semi-structured data in accordance with one or more embodiments.

For further explanation, FIG. 7 sets forth a flowchart of another example method of indexing semi-structured data in accordance with some embodiments of the present disclosure. In the method of FIG. 7, assume that a particular record 102 has been or will be removed from the base table 100. The method of FIG. 7 is similar to FIG. 3, differing in that the method of FIG. 7 also includes removing 702, in response to removing a particular record 102 from the base table 100, any reference to the particular record 102 from the posting of the inverted index 200. As the particular record 102 has been or will be removed from the base table 100, the inverted index 200 need not map any term 202 to the particular record 102. Accordingly, references to the particular record 102 are removed from the posting 204 of the inverted index 200. In some embodiments, this may include searching the inverted index 200 (e.g., using a non-clustered index on the posting 204) to identify those entries 206 including the primary key(s) 104 of the particular record 102 in their posting 204. The posting 204 of these entries 206 is updated to remove the primary key(s) 104 of the particular record 102.

In some embodiments, some entries 206 may only include references to the particular record 102 in their posting 204. Here, removing references to the particular record 102 would leave the posting 204 of these entries 206 empty. Accordingly, in some embodiments, removing 702 any reference to the particular record 102 from the posting 204 of the inverted index 200 includes deleting 704 any entries 206 from the inverted index 200 only referencing the particular record 102 in their posting 204. This prevents the inverted index 200 storing entries 206 with empty postings 204.

Figure 8:
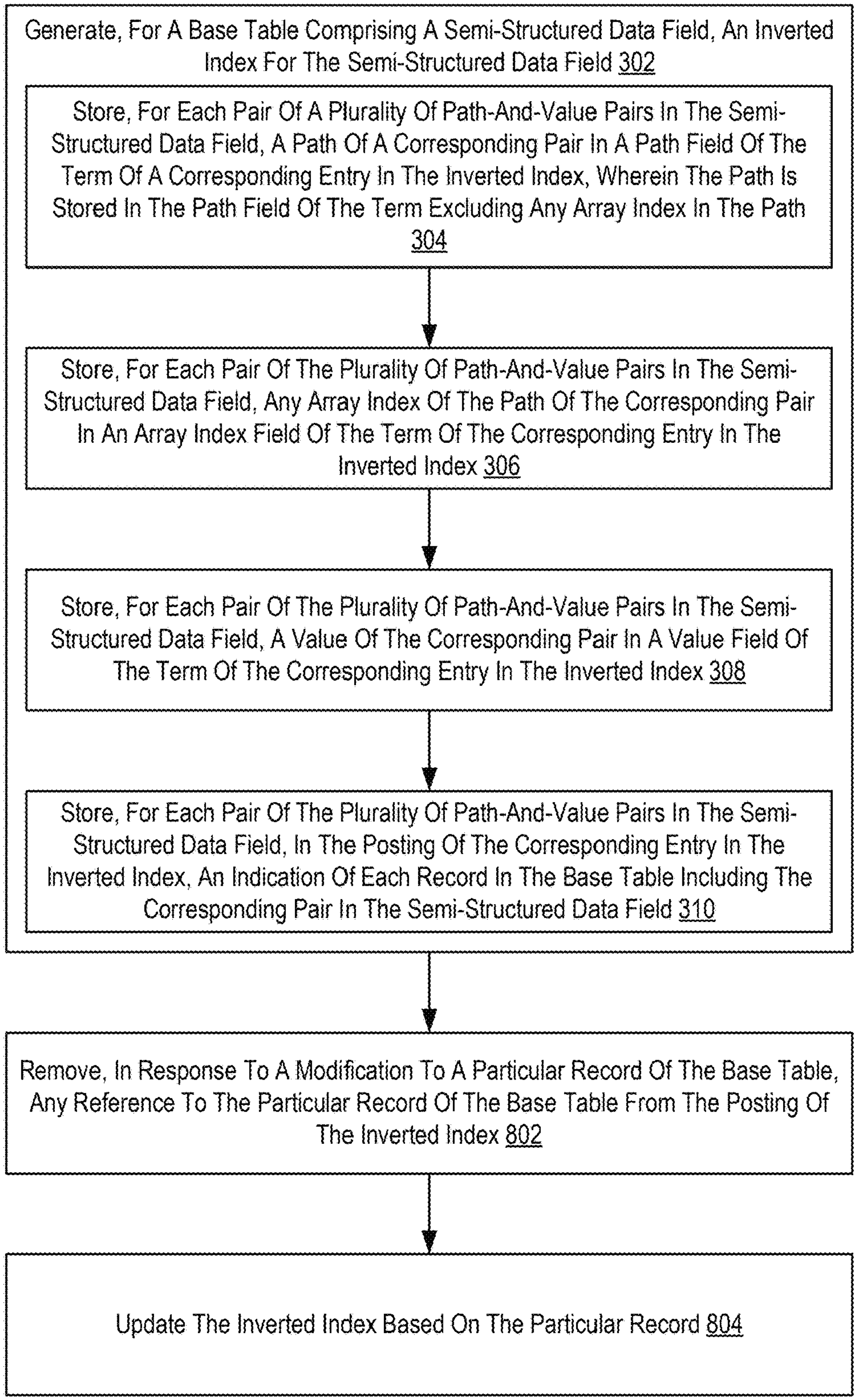
FIG. 8 sets forth a flow chart illustrating an additional example method of indexing semi-structured data in accordance with one or more embodiments.

For further explanation, FIG. 8 sets forth a flowchart of another example method of indexing semi-structured data in accordance with some embodiments of the present disclosure. In the method of FIG. 8, assume that a particular record 102 of the base table 100, particularly the semi-structured data field 106 of the particular record 102. The method of FIG. 8 is similar to FIG. 3, differing in that the method of FIG. 8 also includes removing 802, in response to a modification to a particular record 102 of the base table 100, any reference to the particular record 102 of the base table 100 from the posting 204 of the inverted index. Removing 802 any reference to the particular record 102 is performed using similar approaches as are set forth above with respect to deleting or removing a particular record 102 from the base table 100.

The method of FIG. 8 also includes updating 804 the inverted index 200 based on the particular record 102. Updating 804 the inverted index 200 is performed according to similar approaches as are set forth above with respect to updating 804 the inverted index 200 for a newly added record 102, instead using the particular record 102 that has been modified. In other words, in response to a modification to a particular record 102, the inverted index 200 is updated by first treating the particular record 102 as if it had been removed, necessitating removal 802 of its references from the posting 204 of the inverted index 200. Next, the inverted index 200 is updated 804, treating the modified particular record 102 as a new record 102 added to the base table 100. This is less computationally complex and requires fewer resources than determining how the particular record 102 has been modified and updating any entries 206 that are affected by this modification.

Figure 9:
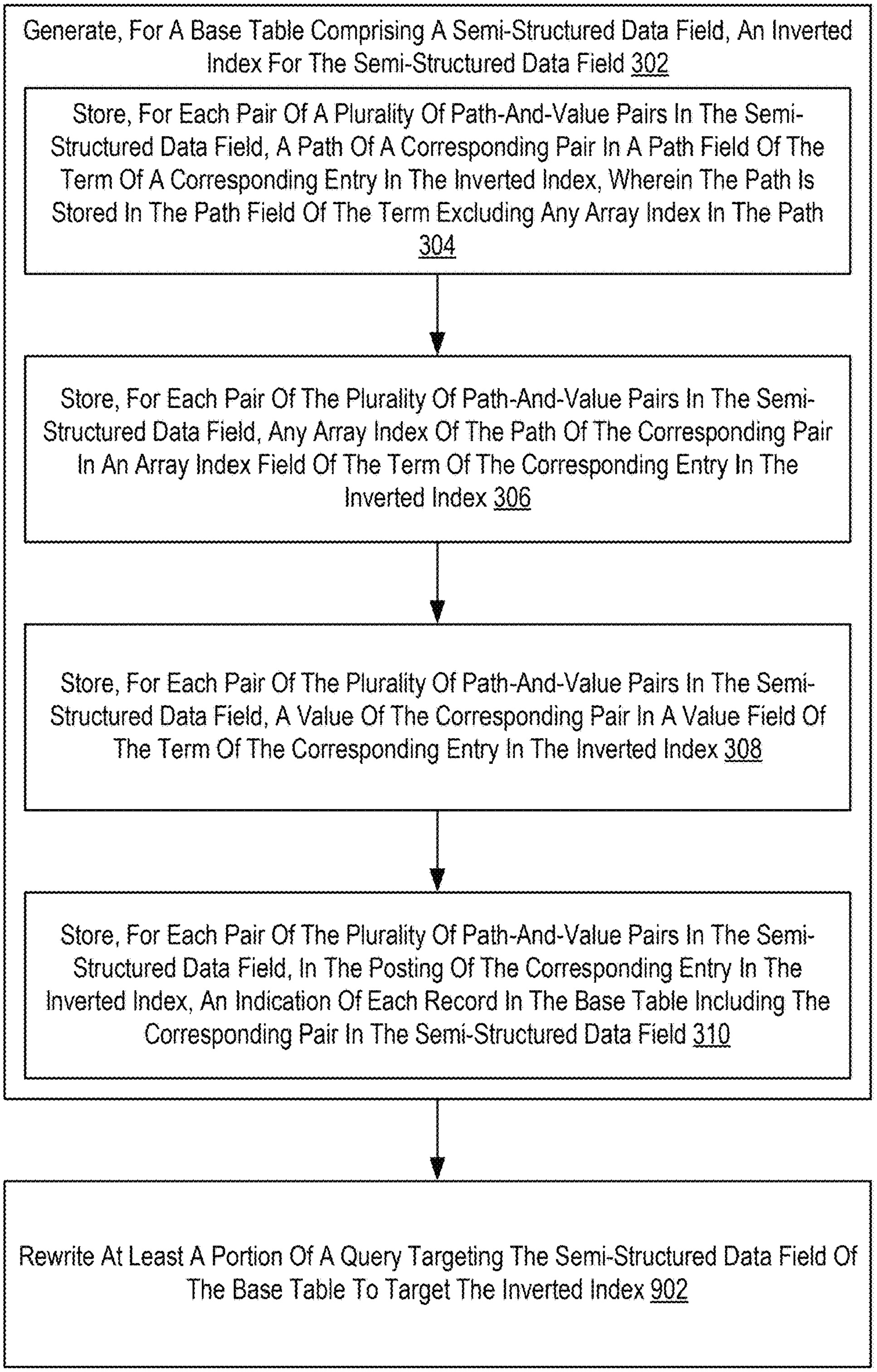
FIG. 9 sets forth a flow chart illustrating an additional example method of indexing semi-structured data in accordance with one or more embodiments.

For further explanation, FIG. 9 sets forth a flowchart of another example method of indexing semi-structured data in accordance with some embodiments of the present disclosure. In the method of FIG. 9, assume that a particular record 102 of the base table 100, particularly the semi-structured data field 106 of the particular record 102. The method of FIG. 9 is similar to FIG. 3, differing in that the method of FIG. 9 also includes rewriting 902 at least a portion of a query targeting the semi-structured data field 106 of the base table 100 to target the inverted index 200. In some embodiments, some query languages support function calls specific to semi-structured data such as JSON, allowing for queries targeting a base table 100 to search or access data from the semi-structured data as part of the query. Accordingly, in some embodiments, rewriting 902 at least a portion of the query includes replacing or modifying a predicate including a semi-structured data-specific function call to remove this function call and include a sub-query or predicate targeting the inverted index 200.

For example, assume a query that includes a json_extract( ) function that queries a semi-structured data field 106 of a particular record 102 for some data at a particular path 208. In this example, the query can be modified to include, instead of the function call, a sub-query that returns a value 210 from an inverted index 200 entry that includes, in its term 202, the particular path 208 (and where applicable, the same array index 212) and, in its posting 204, a reference to the particular record 102. As another example, assume a query that includes a function such as json_contains( ) that searches an array. Here, the query can be modified to include, instead of the function call, a sub-query that compares the array indexes 212 of the inverted index 200 to a bit string that includes wildcard characters (e.g., an underscore) in place of the bits corresponding to the array level to be searched or iterated upon. Readers will appreciate that these approaches leverage existing database query functionality to search or query the semi-structured data field 106 using the inverted index 200 rather than semi-structured data-specific functions.

For further explanation, the sections included below provide some details regarding technologies that may be used to support indexing semi-structured data in accordance with some embodiments. For example, FIG. 10 sets forth an example of a computing device that may be used for some portion of securing an operating system in accordance with some embodiments. As an additional example of technologies that may be used to support indexing semi-structured data, FIG. 11 sets forth a block diagram of a cloud service provider 1102 service architecture in accordance with some embodiments of the present disclosure.

Figure 10:
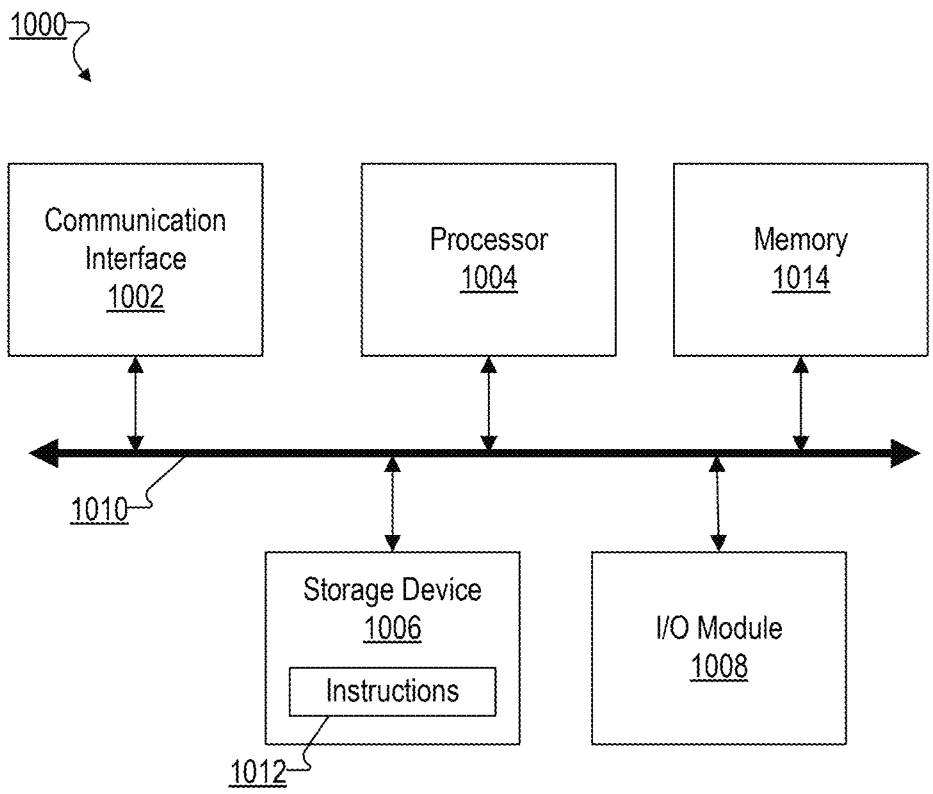
FIG. 10 illustrates an exemplary computing device that may be specifically configured to perform one or more of the processes described in the present disclosure.

For further explanation, FIG. 10 illustrates an exemplary computing device 1000 that may be specifically configured to perform one or more of the processes described herein. As shown in FIG. 10, computing device 1000 may include a communication interface 1002, a processor 1004, a storage device 1006, an input/output (I/O) module 1008, and computer memory 1014 communicatively connected one to another via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data and/or interpreting, executing, and/or directing execution of one or more of the instructions, processes, and/or operations described herein. Processor 1004 may perform operations by executing computer-executable instructions 1012 (e.g., an application, software, code, and/or other executable data instance) stored in storage device 1006.

Storage device 1006 may include one or more data storage media, devices, or configurations and may employ any type, form, and combination of data storage media and/or device. For example, storage device 1006 may include, but is not limited to, any combination of non-volatile media and/or volatile media. Electronic data, including data described herein, may be temporarily and/or permanently stored in storage device 1006. For example, data representative of computer-executable instructions 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 1000.

Figure 11:
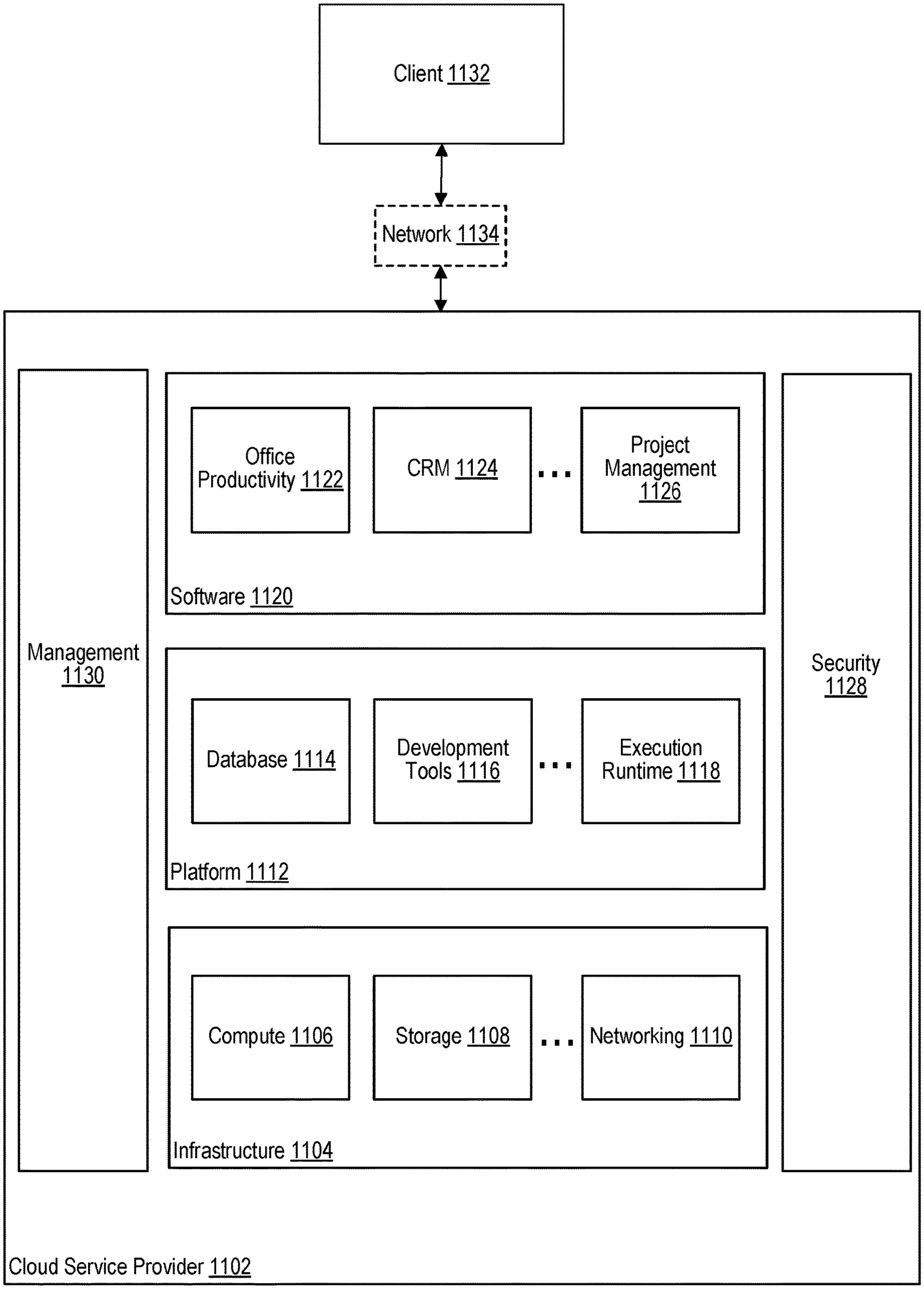
FIG. 11 sets forth a block diagram of a cloud service provider service architecture in accordance with one or more embodiments of the present disclosure.

For further explanation and as an additional example of a supporting technology for indexing semi-structured data, FIG. 11 sets forth a block diagram of a cloud service provider service architecture in accordance with some embodiments. The cloud service provider 1102 can deliver a variety of resources through a services-based consumption model where resources are consumed on-demand and as-a-service. Cloud service providers can provide services via cloud platforms such as, for example, Microsoft Azure™, Amazon Web Services ('AWS')™, Google Cloud Platform ('GCP')™, and others. In FIG. 11, the cloud service provider 1102 is accessed from a client device 1134 via a network 1132.

FIG. 11 depicts an embodiment where software 1120 is delivered as a service. Software-as-a-service ('SaaS') is a model where software applications are delivered over the internet as-a-service. Rather than installing and maintaining software locally, users can access software via a web browser or other network connected interface, eliminating the need for complex software and hardware management on the client-side. In FIG. 11, as examples of software 1120 that can be delivered as-a-service, the illustrated embodiment includes office productivity 1122 software, customer relationship management ('CRM') 1124 software, and project management 1126 software. The office productivity 1122 software can include applications designed to facilitate common business and personal tasks, including word processing applications, applications for spreadsheet creation, presentation design applications, and many others. The CRM 1124 software can include applications for managing a business organization's relationships and interactions with customers and potential customers. The project management 1126 software can include applications designed to help teams plan, organize, and manage projects efficiently by facilitating collaboration and tracking the progress of projects. Readers will appreciate that in other embodiments, other types of software may be delivered using a SaaS model.

FIG. 11 depicts an embodiment where platforms 1112 can be delivered as a service. Platform-as-a-service ('PaaS') is a model that provides cloud customers with platform resources that they can use to develop, run, and manage applications without the complexity of such deploying and managing such infrastructure on their own. In FIG. 11, as examples of platform 1112 resources that can be delivered as-a-service, the illustrated embodiment includes database 1114 services, development tools 1116 services, and execution runtime 1118 services. The database 1114 services can be used to provide access to databases without management overhead for the user as the cloud service provider manages the provisioning, scaling, and maintenance of the databases. The development tools 1116 services can provide developers with tools to design, develop, test, and deploy applications without needing to manage the underlying infrastructure. The execution runtime 1118 services can provide environments where applications or other forms of computer program code can be executed, including services to scale the execution environment. Readers will appreciate that in other embodiments, other platform resources may be delivered using a PaaS model.

FIG. 11 depicts an embodiment where infrastructure 1104 can be delivered as a service. Infrastructure-as-a-Service ('IaaS') is a model that provides virtualized computing resources over the internet, such that infrastructure such as servers, storage, networks, and others may be leased on demand rather than purchasing and maintaining physical hardware. In FIG. 11, as examples of infrastructure 1104 resources that can be delivered as-a-service, the illustrated embodiment includes compute 1106 services, storage 1108 services, and networking 1110 services. The compute 1106 services can be used to provide on-demand access to computational resources such as VMs, containers, and serverless functions, where the cloud service provider manages the provisioning, scaling, and maintenance of such resources. The storage 1108 services can provide storage resources that can be used to store and access data, without the need for customers to purchase and manage on-premises physical storage resources. The networking 1110 services can provide the ability to create and manage virtualized networking resources such as, for example, virtual private networks ('VPNs'), firewalls, load balancers, and more. Readers will appreciate that in other embodiments, other infrastructure resources may be delivered using a PaaS model.

The cloud service provider of FIG. 11 also provides management 1130 resources. The management 1130 resources can include, for example, tools and interfaces that enable customers to efficiently deploy, monitor, and manage, their cloud services. Such tools can include web-based management consoles, command-line interfaces ('CLIs'), APIs, automation tools, and other tools.

The cloud service provider of FIG. 11 also provides security 1128 resources. The security 1128 resources can include, for example, tools and services to help customers protect their cloud environments and ensure compliance with security standards. These tools and services may provide specific aspects of security, including identity and access management, network security, threat detection, compliance management, and others.

Readers will appreciate that many of the components described above may be delivered as services from a cloud service provider. For example, the virtual machines, containers, and pods described above may all be delivered via a cloud service provider. In other embodiments, other forms of compute resources may be used in place of the virtual machines or other compute resource. For example, AWS EC2 instances or other form of cloud compute instances may be utilized in place of the virtual machines.

Advantages and features of the present disclosure can be further described by the following statements:

1. A method of indexing semi-structured data, comprising: generating, for a base table comprising a semi-structured data field, an inverted index for the semi-structured data field, wherein the inverted index comprises a term and a posting, and wherein generating the inverted index comprises: storing, for each pair of a plurality of path-and-value pairs in the semi-structured data field, a path of a corresponding pair in a path field of the term of a corresponding entry in the inverted index, wherein the path is stored in the path field of the term excluding any array index in the path; storing, for each pair of the plurality of path-and-value pairs in the semi-structured data field, any array index of the path of the corresponding pair in an array index field of the term of the corresponding entry in the inverted index; storing, for each pair of the plurality of path-and-value pairs in the semi-structured data field, a value of the corresponding pair in a value field of the term of the corresponding entry in the inverted index; and storing, for each pair of the plurality of path-and-value pairs in the semi-structured data field, in the posting of the corresponding entry in the inverted index, an indication of each record in the base table including the corresponding pair in the semi-structured data field.

2. The method of statement 1, wherein generating the inverted index further comprises truncating at least one of: one or more paths in the path field of the term or one or more values in the value field of the term.

3. The method of statements 1 or 2, wherein generating the inverted index further comprises storing, in one or more other fields of the inverted index, at least one of: the one or more paths in untruncated form or the one or more values in untruncated form.

4. The method of any combination of one or more of statements 1-3, wherein an array index is encoded in the array field as a bit string comprising one or more fixed-length substrings each corresponding to a different array depth.

5. The method of any combination of one or more of statements 1-4, further comprising updating, in response to adding a new record to the base table, the inverted index, comprising: adding, for any path-and-value pairs included in the new record and not reflected in the inverted index, a new entry to the inverted index; and updating, for any inverted index entry with the term matching the new record, the posting to indicate the new record.

6. The method of any combination of one or more of statements 1-5, further comprising removing, in response to removing a particular record from the base table, any reference to the particular record from the posting of the inverted index.

7. The method of any combination of one or more of statements 1-6, wherein removing any reference to the particular record from the posting of the inverted index comprises deleting any entries from the inverted index uniquely referencing the particular record in the posting.

8. The method of any combination of one or more of statements 1-7, further comprising: removing, in response to a modification to a particular record of the base table, any reference to the particular record of the base table from the posting of the inverted index; and updating the inverted index based on the particular record.

9. The method of any combination of one or more of statements 1-8, wherein the inverted index comprises a clustered index for the term and a non-clustered index for the posting.

10. The method of any combination of one or more of statements 1-9, wherein the posting comprises one or more fields corresponding to one or more primary keys of the base table, and wherein the method further comprises rewriting at least a portion of a query targeting the semi-structured data field of the base table to target the inverted index.

11. An apparatus for indexing semi-structured data, comprising: a memory; and one or more processing devices, operatively coupled to the memory, the one or more processing devices configured to: generate, for a base table comprising a semi-structured data field, an inverted index for the semi-structured data field, wherein the inverted index comprises a term and a posting, and wherein, to generate the inverted index, the one or more processing devices are configured to: store, for each pair of a plurality of path-and-value pairs in the semi-structured data field, a path of a corresponding pair in a path field of the term of a corresponding entry in the inverted index, wherein the path is stored in the path field of the term excluding any array index in the path; store, for each pair of the plurality of path-and-value pairs in the semi-structured data field, any array index of the path of the corresponding pair in an array index field of the term of the corresponding entry in the inverted index; store, for each pair of the plurality of path-and-value pairs in the semi-structured data field, a value of the corresponding pair in a value field of the term of the corresponding entry in the inverted index; and store, for each pair of the plurality of path-and-value pairs in the semi-structured data field, in the posting of the corresponding entry in the inverted index, an indication of each record in the base table including the corresponding pair in the semi-structured data field.

12. The apparatus of statement 11, wherein, to generate the inverted index, the one or more processing devices are further configured to truncate at least one of: one or more paths in the path field of the term or one or more values in the value field of the term.

13. The apparatus of statements 11 or 12, wherein, to generate the inverted index, the one or more processing devices are further configured to storing, in one or more other fields of the inverted index, at least one of: the one or more paths in untruncated form or the one or more values in untruncated form.

14. The apparatus of any combination of one or more of statements 11-13, wherein an array index is encoded in the array field as a bit string comprising one or more fixed-length substrings each corresponding to a different array depth.

15. The apparatus of any combination of one or more of statements 11-14, wherein the one or more processing devices are further configured to update, in response to adding a new record to the base table, the inverted index, wherein, to update the inverted index, the one or more processing devices are further configured to: adding, for any path-and-value pairs included in the new record and not reflected in the inverted index, a new entry to the inverted index; and updating, for any inverted index entry with the term matching the new record, the posting to indicate the new record.

16. The apparatus of any combination of one or more of statements 11-15, wherein the one or more processing devices are further configured to remove, in response to removing a particular record from the base table, any reference to the particular record from the posting of the inverted index.

17. The apparatus of any combination of one or more of statements 11-16, wherein, to remove any reference to the particular record from the posting of the inverted index, the one or more processing devices are further configured to delete any entries from the inverted index uniquely referencing the particular record in the posting.

18. The apparatus of any combination of one or more of statements 11-17, wherein the one or more processing devices are further configured to: remove, in response to a modification to a particular record of the base table, any reference to the particular record of the base table from the posting of the inverted index; and update the inverted index based on the particular record.

19. The apparatus of any combination of one or more of statements 11-18, wherein the inverted index comprises a clustered index for the term and a non-clustered index for the posting.

20. A non-transitory computer readable storage medium storing instructions which, when executed, cause a processing device to: generate, for a base table comprising a semi-structured data field, an inverted index for the semi-structured data field, wherein the inverted index comprises a term and a posting, and wherein, to generate the inverted index, the instructions, when executed, cause the processing device to: store, for each pair of a plurality of path-and-value pairs in the semi-structured data field, a path of a corresponding pair in a path field of the term of a corresponding entry in the inverted index, wherein the path is stored in the path field of the term excluding any array index in the path; store, for each pair of the plurality of path-and-value pairs in the semi-structured data field, any array index of the path of the corresponding pair in an array index field of the term of the corresponding entry in the inverted index; store, for each pair of the plurality of path-and-value pairs in the semi-structured data field, a value of the corresponding pair in a value field of the term of the corresponding entry in the inverted index; and store, for each pair of the plurality of path-and-value pairs in the semi-structured data field, in the posting of the corresponding entry in the inverted index, an indication of each record in the base table including the corresponding pair in the semi-structured data field.

Although some embodiments are described largely in the context of a system, method, or in some other way, readers will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

Readers will appreciate that some embodiments are described in which computer program instructions are executed on computer hardware such as, for example, one or more computer processors. Readers will appreciate that in other embodiments, computer program instructions may be executed on virtualized computer hardware (e.g., one or more virtual machines), in one or more containers, in one or more cloud computing instances (e.g., one or more AWS EC2 instances), in one or more serverless compute instances offered such as those offered by a cloud services provider, in one or more event-driven compute services such as those offered by a cloud services provider, or in some other execution environment.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method of indexing semi-structured data, comprising:

generating, for a base table comprising a semi-structured data field, an inverted index for the semi-structured data field, wherein the inverted index comprises a term and a posting, and wherein generating the inverted index comprises:

storing, for each pair of a plurality of path-and-value pairs in the semi-structured data field, a path of a corresponding pair in a path field of the term of a corresponding entry in the inverted index, wherein the path is stored in the path field of the term excluding any array index in the path;

storing, for each pair of the plurality of path-and-value pairs in the semi-structured data field, any array index of the path of the corresponding pair in an array index field of the term of the corresponding entry in the inverted index;

storing, for each pair of the plurality of path-and-value pairs in the semi-structured data field, a value of the corresponding pair in a value field of the term of the corresponding entry in the inverted index; and storing, for each pair of the plurality of path-and-value pairs in the semi-structured data field, in the posting of the corresponding entry in the inverted index, an indication of each record in the base table including the corresponding pair in the semi-structured data field.

2. The method of claim 1, wherein generating the inverted index further comprises truncating at least one of: one or more paths in the path field of the term or one or more values in the value field of the term.

3. The method of claim 2, wherein generating the inverted index further comprises storing, in one or more other fields of the inverted index, at least one of: the one or more paths in untruncated form or the one or more values in untruncated form.

4. The method of claim 1, wherein an array index is encoded in the array field as a bit string comprising one or more fixed-length substrings each corresponding to a different array depth.

5. The method of claim 1, further comprising updating, in response to adding a new record to the base table, the inverted index, comprising:

adding, for any path-and-value pairs included in the new record and not reflected in the inverted index, a new entry to the inverted index; and updating, for any inverted index entry with the term matching the new record, the posting to indicate the new record.

6. The method of claim 1, further comprising removing, in response to removing a particular record from the base table, any reference to the particular record from the posting of the inverted index.

7. The method of claim 6, wherein removing any reference to the particular record from the posting of the inverted index comprises deleting any entries from the inverted index uniquely referencing the particular record in the posting.

8. The method of claim 1, further comprising:

removing, in response to a modification to a particular record of the base table, any reference to the particular record of the base table from the posting of the inverted index; and updating the inverted index based on the particular record.

9. The method of claim 1, wherein the inverted index comprises a clustered index for the term and a non-clustered index for the posting.

10. The method of claim 1, wherein the posting comprises one or more fields corresponding to one or more primary keys of the base table, and wherein the method further comprises rewriting at least a portion of a query targeting the semi-structured data field of the base table to target the inverted index.

11. An apparatus for indexing semi-structured data, comprising:

a memory; and one or more processing devices, operatively coupled to the memory, the one or more processing devices configured to:

generating, for a base table comprising a semi-structured data field, an inverted index for the semi-structured data field, wherein the inverted index comprises a term and a posting, and wherein, to generate the inverted index, the one or more processing devices are configured to:

store, for each pair of a plurality of path-and-value pairs in the semi-structured data field, a path of a corresponding pair in a path field of the term of a corresponding entry in the inverted index, wherein the path is stored in the path field of the term excluding any array index in the path;

store, for each pair of the plurality of path-and-value pairs in the semi-structured data field, any array index of the path of the corresponding pair in an array index field of the term of the corresponding entry in the inverted index;

store, for each pair of the plurality of path-and-value pairs in the semi-structured data field, a value of the corresponding pair in a value field of the term of the corresponding entry in the inverted index; and store, for each pair of the plurality of path-and-value pairs in the semi-structured data field, in the posting of the corresponding entry in the inverted index, an indication of each record in the base table including the corresponding pair in the semi-structured data field.

12. The apparatus of claim 11, wherein, to generate the inverted index, the one or more processing devices are further configured to truncate at least one of: one or more paths in the path field of the term or one or more values in the value field of the term.

13. The apparatus of claim 12, wherein, to generate the inverted index, the one or more processing devices are further configured to store, in one or more other fields of the inverted index, at least one of: the one or more paths in untruncated form or the one or more values in untruncated form.

14. The apparatus of claim 11, wherein an array index is encoded in the array field as a bit string comprising one or more fixed-length substrings each corresponding to a different array depth.

15. The apparatus of claim 11, wherein the one or more processing devices are further configured to update, in response to adding a new record to the base table, the inverted index, wherein, to update the inverted index, the one or more processing devices are further configured to:

add, for any path-and-value pairs included in the new record and not reflected in the inverted index, a new entry to the inverted index; and update, for any inverted index entry with the term matching the new record, the posting to indicate the new record.

16. The apparatus of claim 11, wherein the one or more processing devices are further configured to remove, in response to removing a particular record from the base table, any reference to the particular record from the posting of the inverted index.

17. The apparatus of claim 16, wherein, to remove any reference to the particular record from the posting of the inverted index, the one or more processing devices are further configured to delete any entries from the inverted index uniquely referencing the particular record in the posting.

18. The apparatus of claim 11, wherein the one or more processing devices are further configured to:

remove, in response to a modification to a particular record of the base table, any reference to the particular record of the base table from the posting of the inverted index; and update the inverted index based on the particular record.

19. The apparatus of claim 11, wherein the inverted index comprises a clustered index for the term and a non-clustered index for the posting.

20. A non-transitory computer readable storage medium storing instructions which, when executed, cause a processing device to:

generate, for a base table comprising a semi-structured data field, an inverted index for the semi-structured data field, wherein the inverted index comprises a term and a posting, and wherein, to generate the inverted index, the instructions, when executed, cause the processing device to:

store, for each pair of a plurality of path-and-value pairs in the semi-structured data field, a path of a corresponding pair in a path field of the term of a corresponding entry in the inverted index, wherein the path is stored in the path field of the term excluding any array index in the path;

store, for each pair of the plurality of path-and-value pairs in the semi-structured data field, any array index of the path of the corresponding pair in an array index field of the term of the corresponding entry in the inverted index;

store, for each pair of the plurality of path-and-value pairs in the semi-structured data field, a value of the corresponding pair in a value field of the term of the corresponding entry in the inverted index; and store, for each pair of the plurality of path-and-value pairs in the semi-structured data field, in the posting of the corresponding entry in the inverted index, an indication of each record in the base table including the corresponding pair in the semi-structured data field.

* * * * *